United States Patent
Yano et al.

(10) Patent No.: US 6,962,344 B2
(45) Date of Patent: Nov. 8, 2005

(54) BEARING SEAL FOR WATER PUMP

(75) Inventors: Syuichi Yano, Fujisawa (JP); Takeshi Nakamura, Fujisawa (JP)

(73) Assignee: NSK Ltd., Tokyo-to (JP)

( * ) Notice: Subject to any disclaimer, the term of this patent is extended or adjusted under 35 U.S.C. 154(b) by 0 days.

(21) Appl. No.: 10/676,007

(22) Filed: Oct. 2, 2003

(65) Prior Publication Data

US 2004/0066004 A1 Apr. 8, 2004

Related U.S. Application Data

(63) Continuation of application No. 09/217,819, filed on Dec. 22, 1998, now Pat. No. 6,688,605.

(30) Foreign Application Priority Data

Dec. 26, 1997 (JP) .............................................. 9-360922

(51) Int. Cl.[7] ................................................ F16J 15/32
(52) U.S. Cl. ........................ 277/566; 277/562; 277/571; 277/572
(58) Field of Search ................................ 277/566, 562, 277/571, 572; 384/484

(56) References Cited

U.S. PATENT DOCUMENTS

| | | | |
|---|---|---|---|
| 4,676,514 A | * | 6/1987 | Beutter et al. ................ 277/22 |
| 4,992,023 A | | 2/1991 | Baker et al. |
| 5,975,534 A | * | 11/1999 | Tajima et al. ................ 277/566 |
| 6,003,876 A | * | 12/1999 | Yamagashi et al. ......... 277/407 |

FOREIGN PATENT DOCUMENTS

| | | |
|---|---|---|
| EP | 493 692 A3 | 7/1992 |
| EP | 493 692 A2 | 7/1992 |
| GB | 2 088 480 | 6/1982 |
| GB | 2 249 137 | 4/1992 |
| JP | HE13-77093 | 8/1991 |
| JP | HE13-127098 | 12/1991 |
| JP | HE14-89892 | 8/1992 |
| JP | 08217919 | 8/1996 |
| JP | HE19-14 | 1/1997 |

* cited by examiner

*Primary Examiner*—Enooh E Peavey
(74) *Attorney, Agent, or Firm*—Crowell & Moring LLP

(57) ABSTRACT

A bearing seal for a water pump of an automobile has rolling elements between an outer ring fixed to a casing and a rotary shaft that is provided with a drive portion at one end and an impeller at the other end. In addition, a seal is formed between the outer ring and the rotary shaft by an annular seal body fixed to each end of the outer ring. The seal body on at least the impeller end of the rotary shaft is made of hydrogenated nitrile rubber, to achieve a seal body that is inexpensive but does not deform, even when used in a high-temperature environment in contact with cooling water in a long time.

1 Claim, 5 Drawing Sheets

US 6,962,344 B2

BEARING SEAL FOR WATER PUMP

BACKGROUND OF THE INVENTION

The present invention relates to a bearing seal for a water pump that is suitable for an application such as a water-cooled engine of an automobile and, in particular, to a bearing seal that prevents the intrusion of water, water steam, or the like into a bearing that supports a rotary shaft of a water pump, and which simultaneously prevents any leakage of grease from within the bearing to the outside.

As shown in FIG. 6, a water pump 30 that pressurizes cooling water housed in a pump chamber 50 of an engine to cause it to circulate is generally configured in such a manner that a rotary shaft 12, on which an impeller 32 is fixed at one end and a drive means 60 comprising a pully 61 and a drive belt 62 are fixed at the another end, is supported within a casing 38 by a plurality set of roller bearings 10 disposed having a distance therebetween in the axial direction. The cooling water is sealed from the exterior by a mechanical seal 40 that is disposed between the impeller 32 and the rolling bearings 10. However, since the sliding surface between the inner surface of the mechanical seal 40 and the rotary shaft 12 is in a water-lubricated state, water steam or the like will leak therefrom and will enter the roller bearings 10 side from the sliding surface if no further contrivance is provided. If steam or the like enters the interior of the roller bearings 10, it will damage the roller bearings 10. To prevent the intrusion of water steam or the like from the impeller 32 side into the roller bearings 10 in such a configuration, an annular seal body (not shown) is provided on the impeller 32 side of the roller bearings 10. Nitrile rubber, which has an excellent water resistance, or a fluororubber, which has an excellent thermal resistance, is used as the material of this annular seal body.

SUMMARY OF THE INVENTION

Concomitant with recent increases in engine capacities and outputs, temperature conditions for the surrounding of an engine have become more severe, so that the ambient temperature of such bearings can easily exceed 110° C.

However, the thermal resistance of nitrile rubber reaches a limit at approximately 100° C. Thus, if nitrile rubber is used as the material of a seal body for the bearings 10, thermal deterioration of the seal body will result in cracking and a loss of elasticity of lip portions thereof, so that the sealing properties of the seal body will be lost.

The thermal resistance of fluororubber reaches a limit at a temperature of at least 200° C., so there would be no problem concerning thermal resistance if fluororubber were used under the above temperature conditions, but it is extremely expensive.

There is a further problem with both nitrile rubber and fluororubber in that they will deteriorate and deform if brought into contact with the additives comprises within cooling water, which would damage the sealing properties thereof.

An object of the present invention is to solve the above described problems and provide a bearing seal device for a water pump which is provided with a seal body that can be used in a high-temperature environment, does not deform when in contact with cooling water, and is also inexpensive.

The present invention achieves the above objective by providing a bearing seal for a water pump disposed within a casing, wherein the bearing seal comprises:

an outer ring formed within the casing;

a rotary shaft which is equipped with a drive portion at one end portion and an impeller at another end portion, and which is provided in a freely rotatable manner within the outer ring with rolling elements therebetween; and a seal body affixed to each end of the outer ring in the axial direction;

wherein at least the seal body on a side close to the impeller is formed of hydrogenated nitrile rubber.

In this case, hydrogenated nitrile rubber has superior thermal and chemical resistance in comparison with nitrile rubber, and it also has a superior chemical resistance in comparison with fluororubber. If hydrogenated nitrile rubber is used as a seal body in a bearing for a water pump, therefore, the seal body can be expected to exhibit favorable sealing properties over a long period of time, without deteriorating when used in a high-temperature environment and in contact with cooling water. Thus there is no intrusion of water steam or the like into the bearing, and the bearing efficiency thereof does not deteriorate.

DETAILED DESCRIPTION OF THE INVENTION AND PREFERRED EMBODIMENTS

Embodiments of the bearing seal device of the present invention will be described below with reference to the accompanying drawings.

First Embodiment

Figure 1:
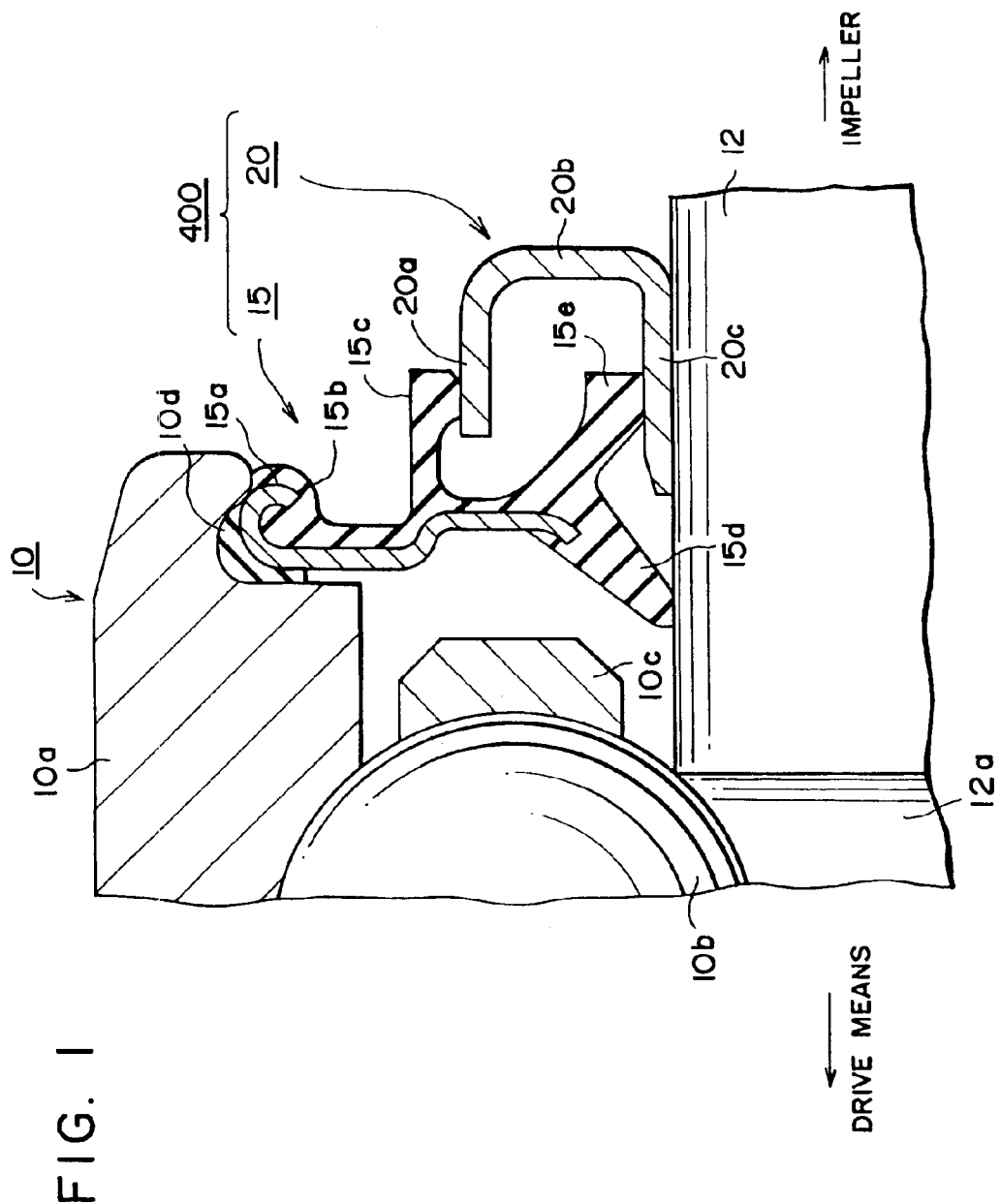
FIG. 1 is a vertical cross-sectional view in the axial direction of essential components of a first embodiment of this invention.

An axial cross-sectional view of a bearing seal 400 in accordance with a first embodiment of this invention is shown in FIG. 1. In this figure, the interior of a bearing 10 is packed with grease or the like, and the bearing 10 itself comprises an outer ring 10a, a rotary shaft 12 that forms an inner ring, balls 10b that are installed between the outer ring 10a and the rotary shaft 12, and a holder 10c that holds the balls 10b. The bearing seal 400 also comprises a seal member 15 and a flinger 20. The seal member 15 is disposed within one of sealing grooves 10d that are provided at each end in the axial direction of the outer ring 10a. The seal member 15 comprises a metal core member 15a and a seal body 15b, where the seal body 15b has three lip portions 15c, 15d, and 15e, as shown in the lower portion of FIG. 1. The metal core member 15a has a cross-section of an inverted L-shape after caulked and is attached to the interior of the sealing groove 10d of the outer ring 10a by caulking.

The seal body 15b is firmly attached to an outer surface of the metal core member 15a.

The seal body 15b is made of hydrogenated nitrile rubber and has a bifurcated cross-sectional shape as shown in FIG. 1. A main lip 15e formed in one part thereof extends obliquely downward to the right in FIG. 1 so as to be formed facing axially outward, and a first sub-lip 15d formed in another part thereof extends obliquely downward to the left in FIG. 1 so as to be formed facing axially inward. A circular cylindrical second sub-lip 15c is formed in such a manner as to extend from the seal body 15b at an intermediate position of the metal core member 15a toward the right in FIG. 1. It is positioned radially outward from the main lip 15e and extends outward in the axial direction.

The flinger 20 is made of stainless steel and is disposed above the rotary shaft 12 on the impeller side thereof. The flinger 20 comprises a small circular cylinder 20c that engages with and is fixed tightly to the outer periphery of the rotary shaft 12, a large circular cylinder 20a that encompasses the small circular cylinder 20c coaxially, and a flange portion 20b that connects the circular cylinder 20a and 20c together in the radial direction.

The configuration is such that the second sub-lip 15c of the seal body 15b is in contact with the outer periphery of the large circular cylinder 20a of the flinger 20, the main lip 15e is in contact with the outer periphery of the small circular cylinder 20c, and the first sub-lip 15d is in contact with the outer peripheral surface of the rotary shaft 12, with each contact forming a sealed portion.

The description now turns to the operation of this bearing seal 400. The configuration is such that, when steam or water droplets of the cooling water are sprayed inward from the outside of the bearing seal 400, they are intercepted by the outer side surface of the flinger 20 so that the cooling water or the like does not come into direct contact with the seal member 15. This makes it possible to prevent distortion or swelling of the seal member 15 (particularly of the second sub-lip 15c).

The grease or the like that fills the interior of the bearing 10 is sealed in by the first sub-lip 15d and the main lip 15e of the seal member 15, thus preventing leakage of the grease to the outside therefrom.

Second Embodiment

Figure 2:
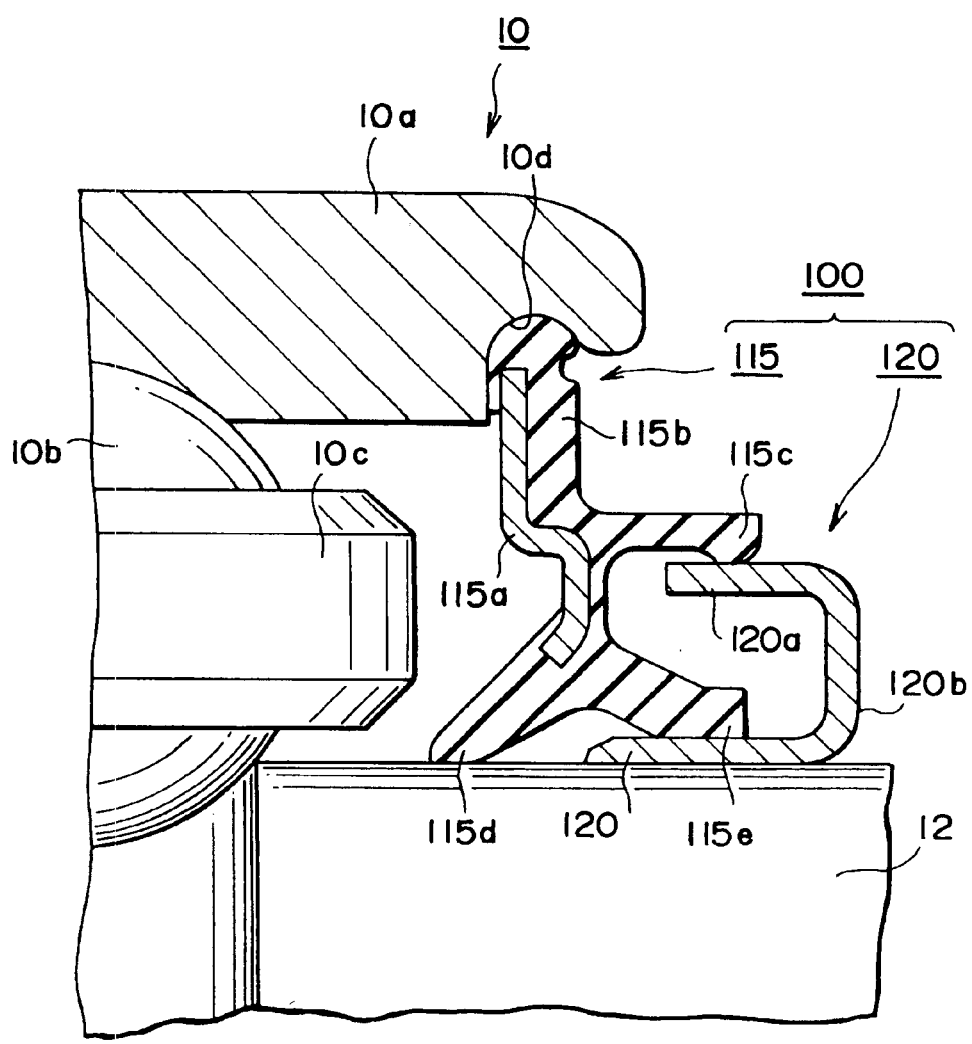
FIG. 2 is a vertical cross-sectional view in the axial direction of essential components of a second embodiment of this invention.

A second embodiment of the present invention will now be described. An axial cross-sectional view of a bearing seal device 100 in accordance with this second embodiment is shown in FIG. 2. The second embodiment differs from the first embodiment only in the structure of the seal member 115. The rest of the configuration is the same, so further description of identical components is omitted herein.

A seal member 115 comprises a metal core member 115a and a seal body 115b made of hydrogenated nitrile rubber, where the seal body 115b has three lip portions 115c, 115d, and 115e, as shown in the lower portion of FIG. 2. The metal core member 115a is an annular plate that is formed in such a manner that an inner peripheral portion thereof is shifted towards the right in FIG. 2. The seal body 115b is firmly attached to an outer surface of the metal core member 115a and an outer edge of the seal body 115b is press-fitted into the sealing groove 10d. The shapes of a main lip 115e, first sub-lip 115d, and second sub-lip 115c of the seal body 115b are configured in a similar manner to those of the first embodiment.

Test Samples

Figure 3:
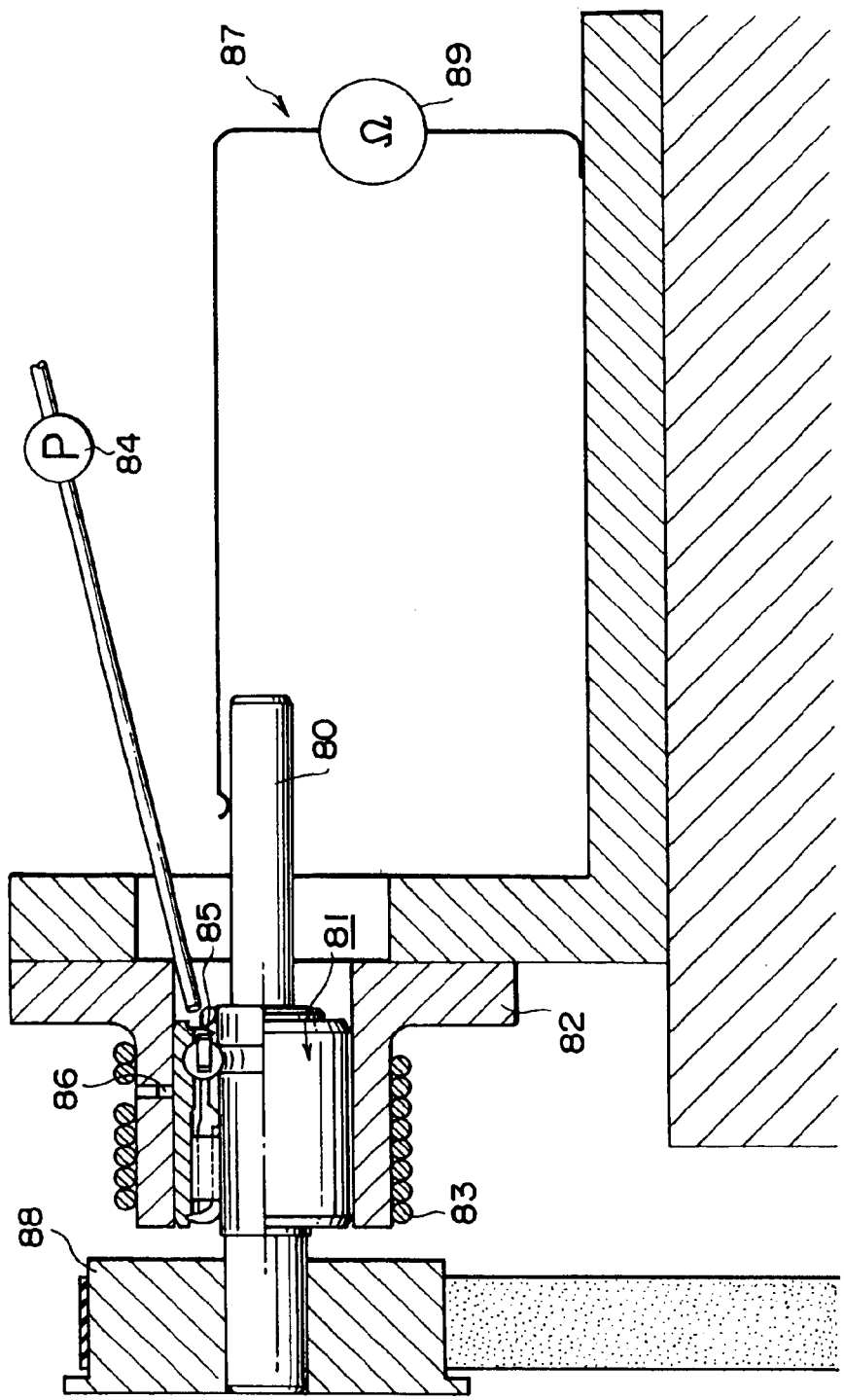
FIG. 3 is a cross-sectional view of a test apparatus used for testing and comparing the capabilities of seal bodies in accordance with the present invention and seal bodies of the prior art.

Thermal resistance and water resistance tests were performed on bearings provided with seal bodies of the configurations shown in FIGS. 1 and 2, using the test apparatus shown in FIG. 3.

The test apparatus of FIG. 3 is configured in such a manner that a test bearing 81 rotated by a drive means 88 is heated by a heater 83 via a housing 82, and a constant quantity of cooling water is supplied thereto by a constant volume pump 84. It also comprises a thermocouple 86 that measures the temperature of an edge portion of the test bearing 81, an electrical resistance measurement circuit 87 that measures, by means of a register 89, the resistance of the bearing shaft 80, and a drive pulley 88 that rotates the bearing shaft 80 at a predetermined rotational speed. This test apparatus was used to investigate changes with time in the efficiency of a seal member 85 provided at an end portion of the test bearing 81.

Bearings in which seal bodies 15, 115 of the configurations shown in FIGS. 1 and 2 were of hydrogenated nitrile rubber were used as text samples of the present invention and prior-art bearings in which seal bodies were of nitrile rubber were used as comparative examples. The results were as shown in FIGS. 4 and 5.

Figure 4:
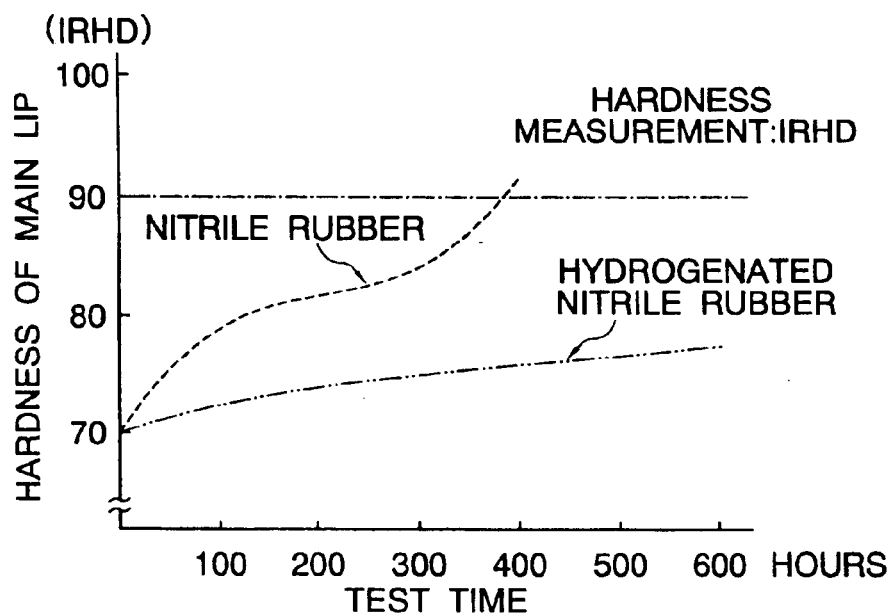
FIG. 4 is a graph of changes in the hardness of the main lip with respect to test time.

FIG. 4 is a graph of changes in the hardness of the main lip (corresponding to the main lip 15e of FIG. 1) of the seal body with respect to test time. Hardness was measured as International Rubber Hardness Degree (IRHD). As shown in this graph (FIG. 4), the bearings that were test samples of this invention, in which the seal bodies were of hydrogenated nitrile rubber, had an elasticity that remained stable over a long period of time, which was 600 hours. In contrast thereto, the prior-art bearings in which the seal bodies were of nitrile rubber deteriorated in that the hardness of the main lips thereof increased with time, cracking and a loss of elasticity caused the seal lips to lose their compliancy, and they became no longer capable of fulfilling a sealing function. From these results, it is clear that the test samples of this invention had less deformation that the comparative examples, and had excellent thermal and chemical resistance properties.

Figure 5:
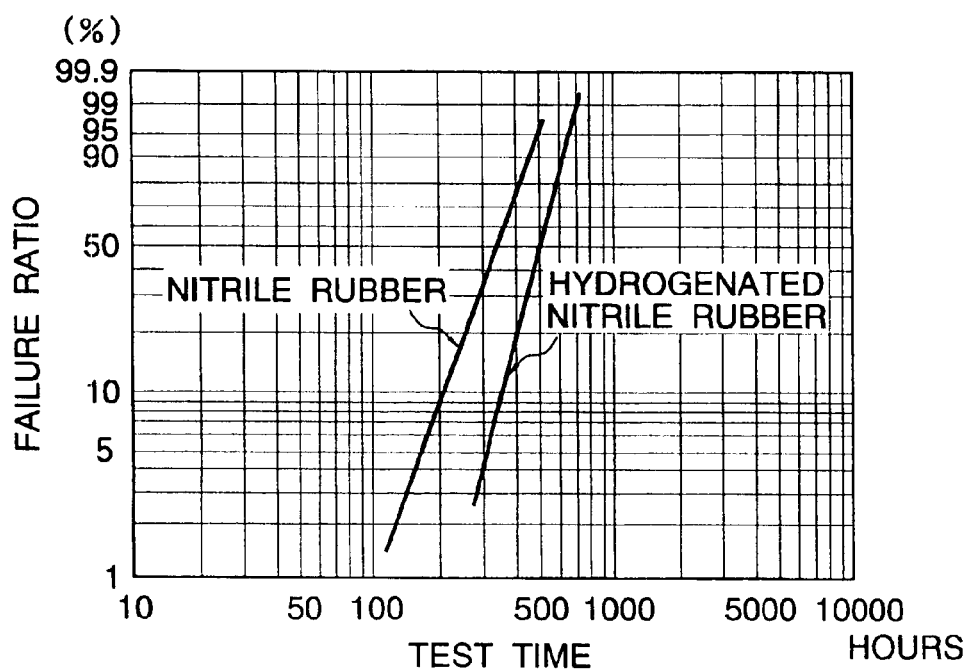
FIG. 5 is a graph of deterioration in the water resistance of seal bodies with respect to test time.
Figure 6:
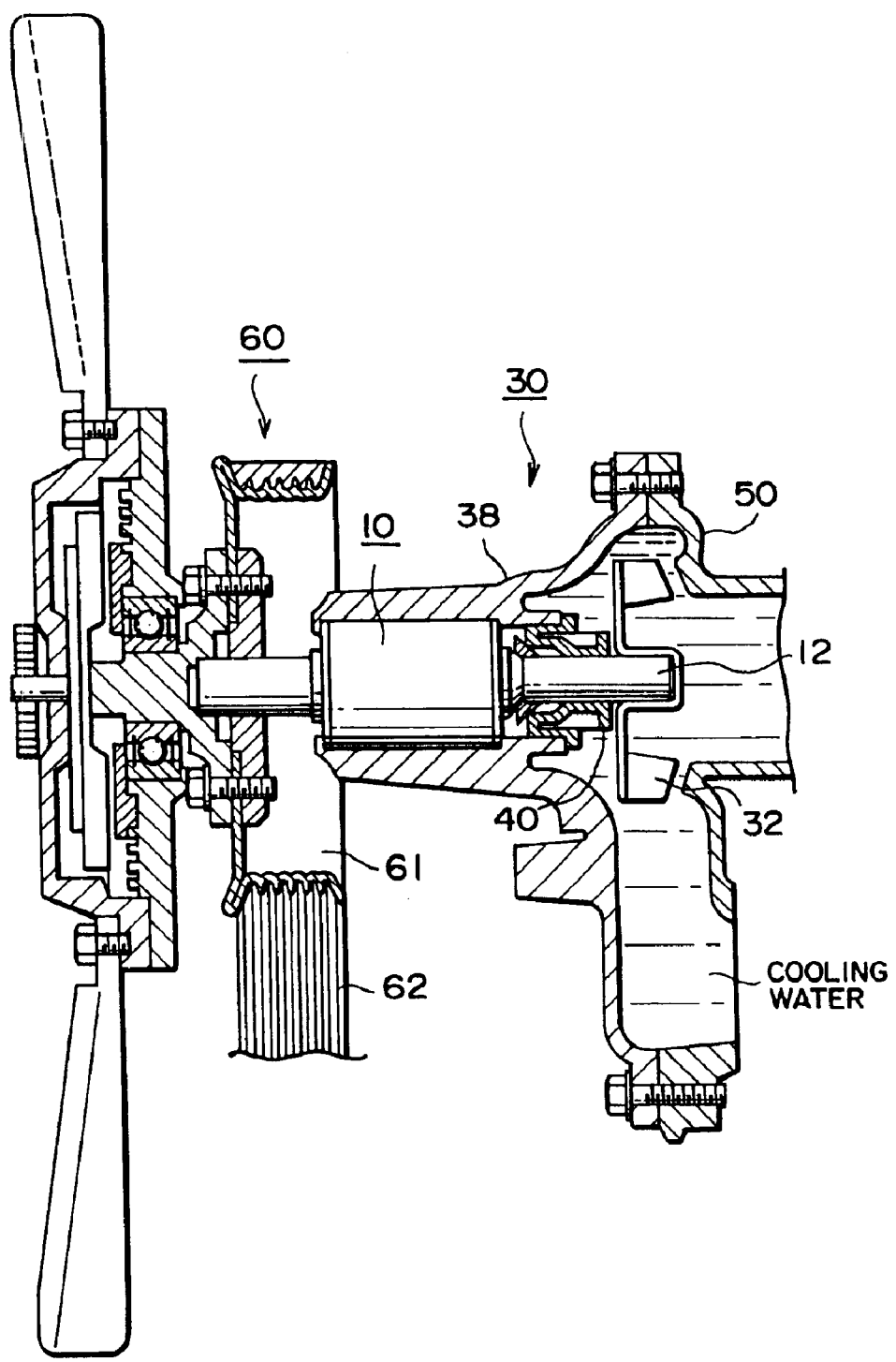
FIG. 6 is a vertical cross-sectional view in the axial direction of a water pump to which the bearing seal of the present invention is applied.

FIG. 5 is a graph representing the deterioration of water resistance in the seal bodies 15, 115 with respect to time. Note that this deterioration of water resistance is expressed as the ratio of the number of samples in which efficiency failed due to water leakage, with respect to the total number of samples.

As shown in this graph (FIG. 5), the bearings that were test samples of this invention, in which the seal bodies were of hydrogenated nitrile rubber, had a 50% failure rate after 500 hours had elapsed, whereas virtually almost all the prior-art bearings in which the seal bodies were of nitrile rubber had failed after 500 hours had elapsed. From these results, it is clear that the test samples of this invention had a far better water resistance than the comparative examples.

Since the seal body 15, 115 in accordance with this invention is made of hydrogenated nitrile rubber, it has superlative thermal and chemical resistance and can exhibit favorable sealing capabilities over a long period of time. There is no intrusion of any water steam or the like that has passed through the mechanical seal from the impeller side, thus ensuring stable bearing capabilities.

What is claimed is:

1. A bearing seal for a water pump disposed within a casing of the water pump and in contact with additives contained in a cooling water circulated by the water pump, wherein said bearing seal comprises:

an outer ring formed within said casing of the water pump:

a rotary shaft which is equipped with a drive portion at one end portion and a water pump impeller at another end portion, and said rotary shaft arranged freely rotatably in said outer ring with rolling elements disposed between said outer ring and said rotary shaft; and a seal member affixed to said outer ring on a side closer to said water pump impeller comprising a metal core member and a seal body, wherein said metal core member is disposed on a side of the seal member closer to said drive portion end portion and said seal body is disposed on a side of the seal member closer to said water pump impeller end portion;

a finger is disposed above said rotary shaft on the impeller side thereof;

wherein said seal body is formed of hydrogenated nitrile rubber and comprises a plurality of lip portions, only an outer edge of the seal body being firmly press-fitted into a sealing groove of said outer ring in direct contact therewith, and said lip portions of the seal body being arranged in slidable contact with an outer peripheral portion of a rotating member or said finger as well as an inner diameter of an inner end of said outer ring being larger than an outer diameter of an outer periphery of said metal core member and wherein a gap is defined between said inner end of said outer ring and said outer periphery of said metal core member disposed toward said sealing groove, whereby excellent chemical resistance is maintained over a long period of time by the use of the hydrogenated nitrile rubber.

* * * * *